Patented Dec. 30, 1930

1,786,530

UNITED STATES PATENT OFFICE

PHILIP H. GROGGINS, OF WASHINGTON, DISTRICT OF COLUMBIA

PROCESS FOR THE PREPARATION OF 4-AMINO-BETA-PHENYL-ANTHRAQUINONE BY AMINATION

No Drawing.   Application filed August 8, 1929.  Serial No. 384,516.

(GRANTED UNDER THE ACT OF MARCH 3, 1883, AS AMENDED APRIL 30, 1928; 370 O. G. 757)

This application is made under the act approved April 30, 1928, and the invention herein described, may be manufactured and used by and for the Government for governmental purposes without payment to me of any royalty thereon.

I have discovered that 4-amino-beta-phenyl-anthraquinone can be obtained by the replacement of the halogen group in 4-halogen-beta-phenyl-anthraquinone by an amino group. The chemical reaction is expressed as follows wherein (hlg) represents a halogen atom:

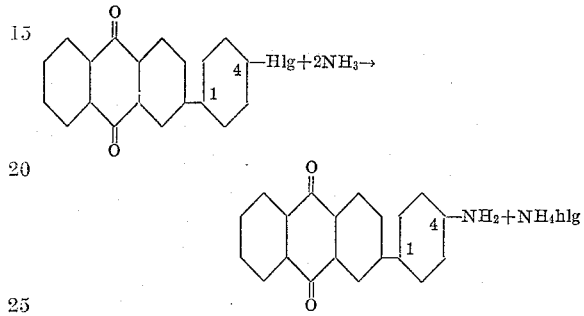

The replacement is accomplished by heating with ammonia under pressure. I have found that the addition of definite amounts of nitrobenzene, copper, and its salts serve as catalysts and accelerate the reaction.

When in a pure state, 4-amino-beta-phenyl-anthraquinone is obtained as bright red lustrous needle crystals. It melts at 221.5–222.0° C. It is readily soluble in chlorobenzene, dichlorobenzene and strong sulfuric acid. It gives all the usual characteristic reactions of anthraquinone derivatives of this class. With acids it forms the characteristic amino salts which are only slightly soluble in boiling water.

Without limiting my invention to any particular procedure, the following examples in which parts by weight are given, illustrate the application of my invention in the preferred form.

*Example I.*—Twenty parts of 4 (hlg)-beta-phenyl-anthraquinone are mixed with 250 parts of 29 per cent ammonia, 10 parts of nitrobenzene, and 1 part cuprous chloride as catalyst. The mixture is then heated at 220° C. for 24 hours in a pressure autoclave provided with an agitator. The ammonia and nitrobenzene are then removed by distilling with steam. The amino compound is then obtained by filtering. It can be purified by recrystallizing from ortho-dichlorobenzene.

*Example II.*—Twenty parts of 4-chloro-beta-phenyl-anthraquinone are mixed with 250 parts of ammonia, 0.5 parts cuprous chloride and 1.0 part of copper. The charge is heated in a pressure autoclave provided with an agitator for 24 hours at 240° C. The red amino compound is obtained by filtering off the ammoniacal solution.

I am aware that numerous details of the process may be varied through a wide range without departing from the spirit of this invention, and I do not desire limiting the patent granted hereon otherwise than as necessitated by the prior art.

I claim as my invention—

1. The process of preparing 4-amino-beta-phenyl-anthraquinone, which comprises heating 4-halogen-beta-phenyl-anthraquinone with aqueous ammonia under pressure.

2. The process of preparing 4-amino-beta-phenyl-anthraquinone, which comprises heating 4-halogen-beta-phenyl-anthraquinone with ammonia under pressure in the presence of nitrobenzene.

3. The process of preparing 4-amino-beta-phenyl-anthraquinone, which comprises heating 4-halogen-beta-phenyl-anthraquinone with aqueous ammonia under pressure in the presence of a mixture of metallic copper and its cuprous salts.

4. The process of preparing 4-amino-beta-phenyl-anthroquinone which comprises heating 4-chloro-beta-phenyl-anthraquinone with aqueous ammonia in the presence of nitrobenzene and a copper catalyst and then precipitating the amino compound by cooling the ammoniacal solution.
5. As a new article of manufacture 4-amino-beta-phenyl-anthraquinone having most probably the following chemical formula.
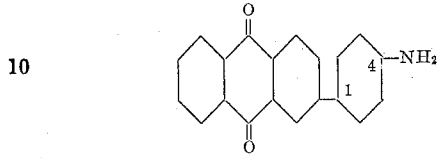
In testimony whereof I have hereunto subscribed my name.
PHILIP H. GROGGINS.